United States Patent [19]

Van Fossen

[11] 4,015,636

[45] Apr. 5, 1977

[54] CERAMIC REFRACTORY COVERING MEMBERS

[75] Inventor: Don B. Van Fossen, Alliance, Ohio

[73] Assignee: The Babcock & Wilcox Company, New York, N.Y.

[22] Filed: Dec. 4, 1975

[21] Appl. No.: 637,569

[52] U.S. Cl. .............................. 138/149; 138/155; 138/175; 432/234

[51] Int. Cl.² ...................... F16L 9/10; F16L 9/22; F27B 9/14

[58] Field of Search .......... 432/233, 234, 235, 246, 432/248; 138/148, 149, 147, 155, 175

[56] References Cited

UNITED STATES PATENTS

| | | | |
|---|---|---|---|
| 2,805,972 | 9/1957 | Cross, Jr. et al. | 138/148 |
| 3,226,101 | 12/1965 | Balaz et al. | 432/234 |
| 3,486,533 | 12/1969 | Doherty et al. | 432/243 |
| 3,537,486 | 11/1970 | Hullhorst | 138/147 |
| 3,881,864 | 5/1975 | Nicol | 432/234 |
| 3,941,160 | 3/1976 | Campbell, Jr. | 138/149 |

Primary Examiner—John J. Camby
Assistant Examiner—Henry C. Yuen
Attorney, Agent, or Firm—Joseph M. Maguire; Vincent M. Fazzari; Albert P. Cefalo

[57] ABSTRACT

An illustrative embodiment of the invention relates to a preburned ceramic refractory covering for a water cooled member forming a structural portion of a metallurgical furnace. The covering comprises an inner layer of split ceramic refractory tiles at least partially encircling the structural member, and a C-shaped ceramic refractory collar which slideably engages the split tiles disposed about the member and supports the tiles thereon.

6 Claims, 5 Drawing Figures

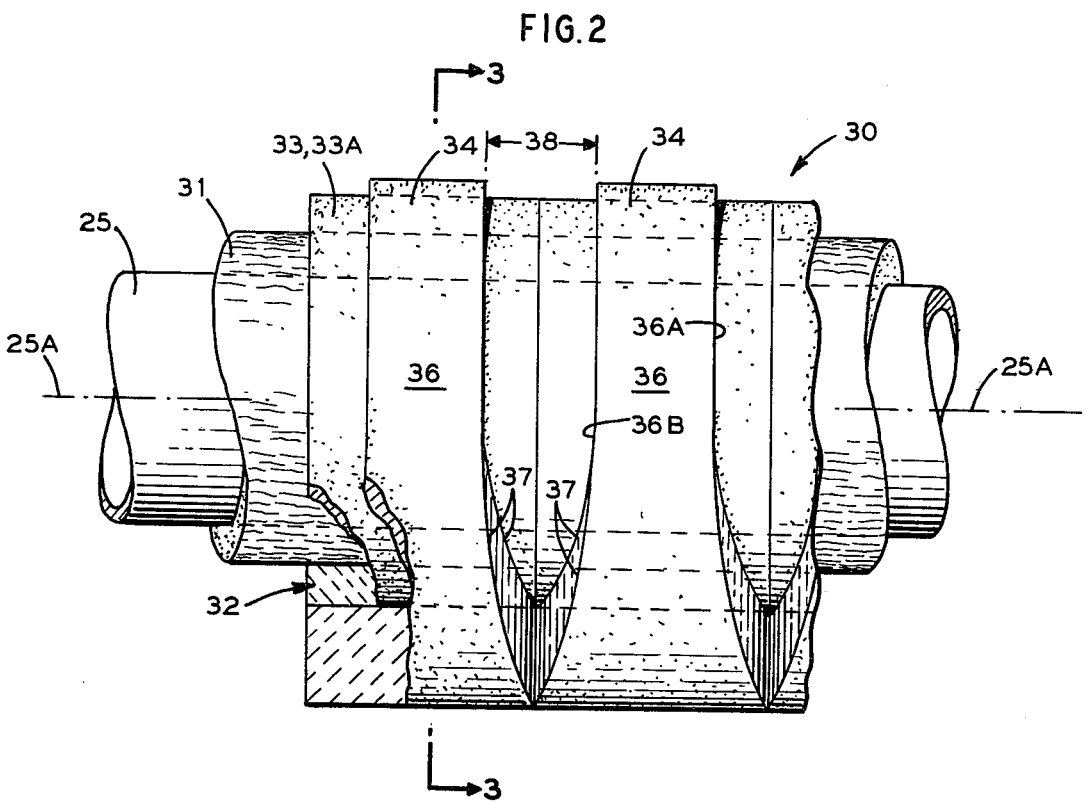

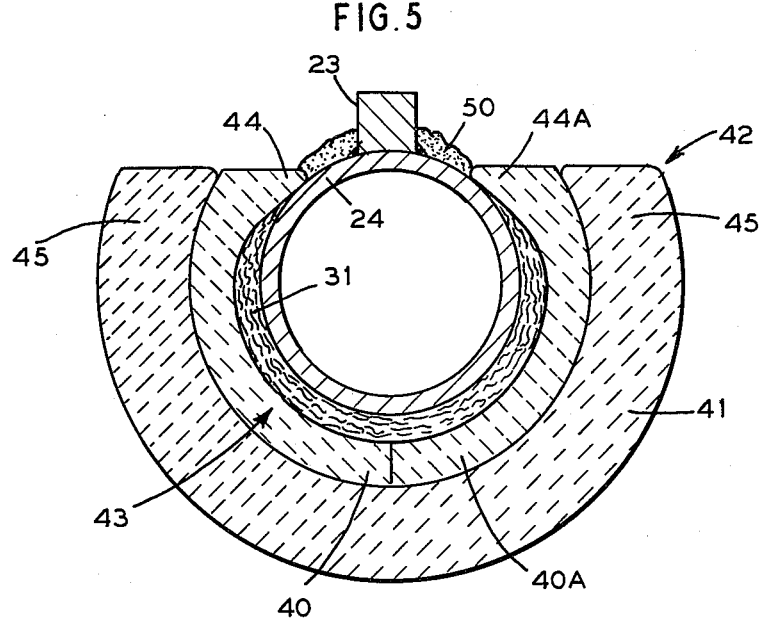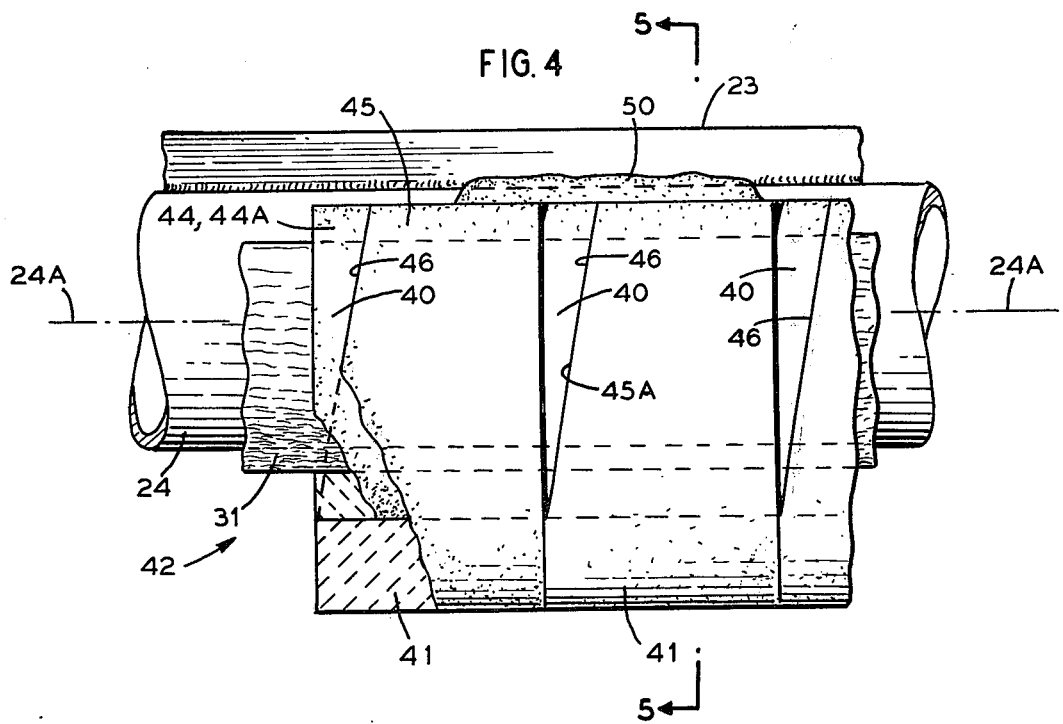

CERAMIC REFRACTORY COVERING MEMBERS

BACKGROUND OF THE INVENTION

1. Field of the Invention

This invention relates to metallurgical furnaces of the type used to reheat previously shaped billets, wherein the shaped billets to be treated move along rails supported by water cooled tubular support members, and more particularly, to an assembly of pre-burned ceramic refractory members for use in protecting the water cooled supports in the furnace.

2. Description of the Prior Art

In the preparation of steel billets, slabs and other metal workpieces preparatory to further shaping or forming, it is customary to subject the workpieces to direct heating while passing through a furnace. The billets, moreover, move through the furnace on skid rails which are supported from below by horizontal and vertical water cooled tubular support members. With this construction, fuel may be burned both above and below the skid rails so that the billets or workpieces may be uniformly heated from all sides.

In the continuous furnace of the type described above, the billets or workpieces are generally heated to a temperature on the order of 2,000° F. Clearly, the skid rails and the support tubes must be protected by sufficient insulating material to minimize the heat lost to the water cooled tubes, and further, to minimize the erosion and corrosion of the tubes resulting from the high temperatures and oxidation environment encountered in the furnace.

In the past, it has been recognized as desirable to insulate these water cooled support members by applying a lining or covering of fibrous insulating material, as shown in Balaz et al U.S. Pat. No. 3,226,101, or by applying ceramic tiles assembled in encircling relationship to the water cooled support members or the skid rails as shown in the patents to McCullough U.S. Pat. No. 3,055,651 and Nicol U.S. Pat. No. 3,881,864. In general, however, it has been found that the combination of both fibrous insulation and ceramic tiles covering the insulation provide the best protection for the water cooled supports. That is, the fibrous insulation thermally insulates the support members, and the outer covering of ceramic refractory tiles protect the fibrous insulation from the deleterious effects of the furnace gases. In this combination of insulation and ceramic tiles, the encircling ceramic tiles are subjected to intense vibrational loadings caused by movement of the slabs and large thermal stresses as a result of temperature gradients therethrough which may cause cracking of the tiles. The internal stresses, moreover, are more pronounced in the vicinity of the engagement means employed to interlock adjacent tiles or individual tiles to the tubular support members. In general, the aforementioned engagement means consists of a metallic stud welded to the tubular support member and/or interlocking lug members formed in the ceramic tile, such as shown in the Schmidt U.S. Pat. No. 2,436,452. Furthermore, the complex arrangement generally employed in holding the ceramic tile members together about the tubular support member renders replacement of a single ceramic section quite difficult.

Necessarily, the tiles must be segmental not only for ease of installation, but also to provide for thermal expansion and contraction in the ceramic and between the ceramic and the metal of the pipes, during furnace operations.

Therefore, there is a need to provide industry with an insulation and protection arrangement which economically and efficiently insulates the tubular members, protects the insulation from the furnace gases, minimizes the magnitude of internal stress and loading imposed thereon and which provides a simple method of replacing a single ceramic tile section of the protection arrangement.

SUMMARY OF THE INVENTION

These difficulties are overcome, to a large extent, through the practice of the invention. Illustratively, the water cooled furnace support members are provided with a refractory covering having an inner layer of split ceramic refractory tiles disposed about the member and held in position by an outer layer forming a ceramic refractory collar about the inner layer.

Specifically, a refractory covering for application to the water cooled furnace member includes ceramic refractory tiles cylindrically formed as a semi-circular split ring disposed about the member, a thermal insulating material, such as, a ceramic refractory fiber e.g. Kaowool ceramic refractory fiber insulation, disposed between the member and the semi-circular split ring tiles, and a ceramic refractory collar which slideably engages the split ring tiles, or more particularly, slideably encloses circumferentially more than 180° of the split ring pair. That is, the collar is formed as a cylindrical ring shaped covering having an open sector therein of sufficient dimension, such that the collar may be disposed about the bare furnace member and then slideably engaged with the split ring tiles of the refractory covering enclosed about the member. Accordingly, the cylindrical ring shaped collar necessarily includes a minimum internal diameter of sufficient size such that the collar may at least slideably engage with the split rings and hold the split ring tiles in position about the rings and hold the split ring tiles in position about the furnace member.

More specifically, a refractory covering for application to a water cooled furnace member according to this invention further includes a C-shaped ceramic refractory collar, a C-shaped inner layer formed from a pair of C-shaped split ring tiles, each having a cylindrical surface and arm portions extending therefrom in a general circumferential enclosing manner ending in end portions which define the open dimension of the open sector of the C-shape inner layer. In addition, the collar arm portions may be tapered in the longitudinal direction, i.e. the axial direction of the furnace member, resulting in decreased overall maximum shear moment and inertial loading due to the accompanying reduced collar mass. In this manner, not only is it possible to provide a simple ceramic refractory tile covering which is relatively easy to manufacture in simple molds, which provides a simple method of installation and which has a more durable structure because of the lack of stress concentration areas, but also, the covering of this invention is adaptable to all of the furnace support members, i.e. vertical, horizontal and skid rail support members.

Various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 2 is a side view of a preferred embodiment of the ceramic refractory tiles of the present invention assembled on a water cooled member.

FIG. 4 is a side view of a further embodiment of the ceramic refractory tiles of the present invention assembled on a water cooled skid rail.

FIG. 5 is a sectional view of FIG. 4 taken along line 5—5.

DETAILED DESCRIPTION OF THE PREFERRED EMBODIMENTS OF THE INVENTION

For a more complete appreciation of the invention, attention is invited to the following description of the invention, as shown in the attached drawings.

Figure 1:
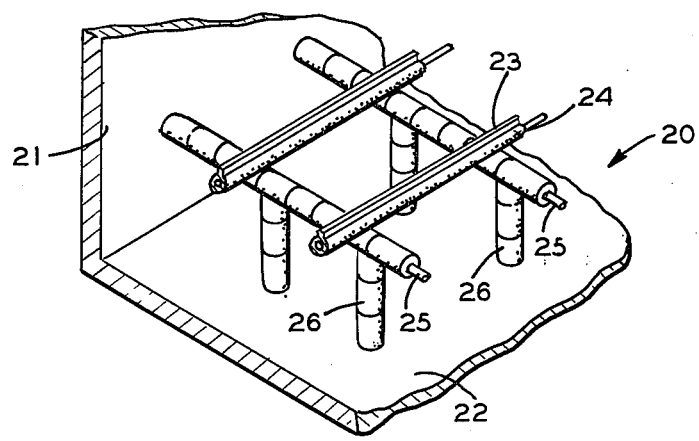
FIG. 1 is a perspective view of a portion of a furnace including water cooled pipe structures which are protected by the refractory of the present invention.

Referring to FIG. 1 a billet reheating furnace 20 is illustrated with a side wall 21 and floor 22 in which the floor 22 of the furnace provides the foundation for the skid rails 23. The skid rails are directly mounted upon generally horizontally extending water cooled tubes 24 which are in turn supported by transverse and vertically extending water cooled support tubes 25 and 26, respectively. In the construction shown, the remaining side and end walls and the roof of the furnace are not illustrated since such construction is common in the art. Moreover, it will be understood that heat is applied to the heating furnace in the customary manner either by fuel combustion or by other heating means.

Figure 3:
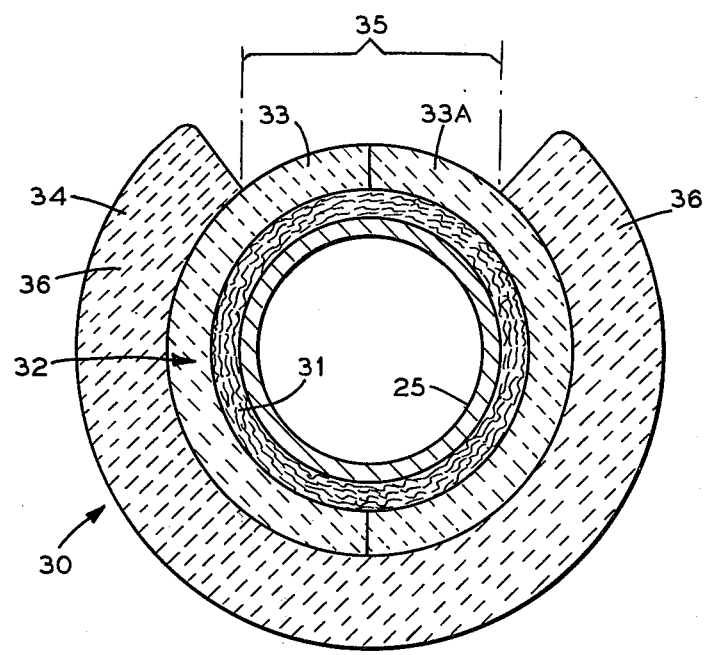
FIG. 3 is a sectional view of FIG. 2 taken along line 3—3.

One form of the ceramic tile covering 30 of the present invention is illustrated in FIGS. 2 and 3 in connection with a water cooled support member, e.g. the transverse support member 25, having a longitudinal axis 25A—25A. As shown, the tiles 30 form a protective ceramic covering about a fibrous thermal insulation, e.g. Kaowool ceramic refractory fiber, 31, encircling the member 25, wherein the covering 30 has an inner cylindrical layer 32 of split ceramic refractory tiles 33 and 33A, and an outer layer or collar 34. In general, the split tiles 33 and 33A forming the inner cylindrical layer 32 are each formed as a C-shaped sector of a hollow cylindrical ring, having an internal diameter suitably dimensioned to enclose the support member 25 and the fiber insulation 31. As shown in this embodiment the split tiles are identically formed simple structures for ease of manufacturing, inventory and replacement purposes.

In accordance with this invention, the ceramic refractory collar 34 is provided to hold the split tiles 33 and 33A in position about the fibrous insulation and the furnace member to be protected. The collar 34 is shown in its normal position (FIGS. 2 and 3) as a partially encircling C-shaped cylindrical member, having an open circumferential segment of minimum opening width 35 suitable to allow the collar to be disposed about the member 25 in encircling relationship, i.e. a minimum width 35 greater than the outside diameter of the member 25, and a maximum opening width 35 less than the outside diameter of the inner layer 32, thereby ensuring that the outer layer 34 bears against the inner layer in encircling, relationship. The collar 34 is so constructed such that it extends about the major portion (i.e. greater than 180° included angle) of the circumferential dimension. Further, the internal diameter of the collar is suitably dimensioned to allow the collar to be slideably positioned over the encircling split tiles 33 and 33A disposed about the member 25. In this manner, the collar 34, substantially encircling the split tiles, holds the split tiles together and prevents the inner layer 32 from separating from the member 25. In addition, the simple structure of the collar results in a tile covering of relative ease of manufacture.

Further, in accordance with this invention, the ceramic collar 34 may be formed with either constant width or inwardly tapered arm portions 36, FIG. 2. The tapered collar, i.e. sides 36A and 36B of the arms 36 are tapered in the longitudinal direction along both of the C-shaped collar's arm portions. The tapered arm portions reduce the overall collar loadings due to the reduced collar mass, during, for example, vibrations caused by the moving billets, and in addition, the tapered arm portions provide a simple method of replacing the inner tile layer 32, the collar 34, and also, the tapered collar provides a simple method of installing the last ceramic covering section or any intermediate tile covering section on a water cooled member. Further, although the collar 34 shown here has a tapered arm 36 having an optimum curvilinear taper 37, that is designed from the standpoint of minimizing the loading, any collar taper suitable for reducing the collar loadings while maintaining the integrity of the refractory covering is adequate.

In accordance with this embodiment of the invention, the tapered collar, or more specifically, the tapered arm portions 36 provide a substantial gap 38 (FIG. 2) between adjacent collars, which allows neighboring collars 34 to be displaced longitudinally along the member 25, i.e. closer together, when alternate collars are rotated about the member from their normal position. Accordingly, in order to place, for example, the last section of refractory tile covering on the end of a member, e.g. at the junction of the horizontal 25 and vertical member 26, alternate neighboring collars are rotated about the longitudinal axis of the member-tile covering system such that the wide portion of the rotated collars is disposed substantially 180° opposite the wide portions of the neighboring collars. In this manner, sufficient adjacent collars may be displaced, closer together, longitudinally along the gap 38 formed between each of these adjacent collars such that the collar for the last section may then be disposed about the base member 25 and longitudinally displaced over the split tile members of the adjacent, next to last, inner tile covering section. The split tiles of the last section are then positioned on the member 25, the collar, engaged with the split tiles of the adjacent section, is longitudinally displaced over the tiles of the last section and the previously rotated and displaced collars are returned to their normal position. In addition this method of installation is applicable in replacing a section of refractory tiles at any position along a member.

A further embodiment of the invention is disclosed in FIGS. 4 and 5 where the individual split tiles 40 and 40A and collar 41 of the refractory covering 42 are disposed about the longitudinal axis 24A—24A of the water cooled member 24 of skid rail 23. As shown, particularly in FIG. 5, both of the split tiles 40 and 40A are formed as a C-shaped tile member forming a cylindrical ring 43 of internal diameter suitably dimensioned to enclose the fiber insulation wrapped member 24, and also, forming a C-shaped inner tile layer. That is, in this embodiment, the split tiles form an inner cylindrical ring layer having a circumferential expanse of less than 360° in order not to interfere with the skid rail 23. Further, the identically formed split tiles 40 and 40A are formed with a beveled lip 44 and 44A respectively at the open end of the C-shaped inner layer, in order to ensure that the split tiles will bear against the member 24.

In accordance with this embodiment of the invention, the ceramic collar 41, which slideably engages the split tiles 40 and 40A, is disclosed (FIGS. 4 and 5) having a general cylindrical C-shaped configuration with the same general opening constraints, explained above, with respect to engaging the tiles and freedom of interference with the skid rail 23 and the billets thereon. Moreover, the collar 41 of this embodiment is formed having an inwardly tapered arm portion 45 (FIG. 4) of reduced complexity than that shown in FIG. 3, that is, one side 45A of arm 45 is formed with a linear longitudinal taper 46. The collar 41, therefor, still further reduces the complexity of refractory coverings and increases the ease of manufacturing thereof. Accordingly, as explained above, the tapered arm portion 45 of this embodiment reduces the overall collar loading, and also, provides a simple method of installation of end tile coverings and replacing installed tile sections.

Further, in the embodiment of the invention shown in FIG. 5 the exposed portion of the member 24 not covered by the C-shaped refractory covering may be protected by a ceramic refractory cement 50, or mix, commonly known in the industry.

In accordance with this invention, a simple durable ceramic refractory tile covering, easy to manufacture in simple molds, provides a simple method of installation of a refractory covering adaptable to all of the water cooled furnace support members.

The embodiments of the invention in which an exclusive property or privilege is claimed are defined as follows:

1. A refractory covering for application to a fluid conveying tubular member comprising a thermal insulating layer disposed about and contacting the tubular member, an inner ceramic refractory layer of split tiles disposed about and contacting the insulating layer, and an outer ceramic refractory tile layer forming a unitary collar contacting and extending about a major portion of the outer circumference of the inner tile layer to hold the split tiles together and to completely provide support of the collar by the tubular member.

2. A refractory covering according to claim 1 wherein the collar is formed to slidably engage the split tiles.

3. A refractory covering according to claim 2 wherein the split tiles are cylindrical C-shaped members.

4. A refractory covering according to claim 3 wherein the collar is a cylindrical C-shaped member.

5. A refractory covering according to claim 4 wherein the C-shaped collar provides an open sector having a width greater than the outside diameter of the tubular member and less than the outside diameter of the inner tile layer.

6. A refractory covering according to claim 5 wherein the collar is formed with opposed pairs of axially spaced arms.

* * * * *